United States Patent
Kodama

(10) Patent No.: US 8,757,883 B2
(45) Date of Patent: Jun. 24, 2014

(54) DISK DRIVE DEVICE

(75) Inventor: Mitsuo Kodama, Shizuoka (JP)

(73) Assignee: Samsung Electro-Mechanics Japan Advanced Technology Co., Ltd., Shizuoka (JP)

( * ) Notice: Subject to any disclaimer, the term of this patent is extended or adjusted under 35 U.S.C. 154(b) by 249 days.

(21) Appl. No.: 12/852,425

(22) Filed: Aug. 6, 2010

(65) Prior Publication Data

US 2011/0033144 A1 Feb. 10, 2011

(30) Foreign Application Priority Data

Aug. 7, 2009 (JP) ................................. 2009-184769

(51) Int. Cl.
*F16C 32/06* (2006.01)

(52) U.S. Cl.
USPC ........................................ 384/110; 384/114

(58) Field of Classification Search
USPC .................... 384/100–120; 310/90; 360/99.08
See application file for complete search history.

(56) References Cited

U.S. PATENT DOCUMENTS

| | | | | |
|---|---|---|---|---|
| 6,144,523 | A * | 11/2000 | Murthy et al. | 360/99.08 |
| 2002/0048418 | A1 * | 4/2002 | Okamura et al. | 384/114 |
| 2003/0123763 | A1 * | 7/2003 | Takahashi | 384/100 |
| 2004/0005101 | A1 * | 1/2004 | Grantz | 384/110 |
| 2004/0179758 | A1 * | 9/2004 | Ohno | 384/100 |
| 2006/0039637 | A1 * | 2/2006 | Huang | 384/114 |
| 2006/0104555 | A1 * | 5/2006 | Braun | 384/110 |
| 2009/0154852 | A1 | 6/2009 | Asada et al. | |

FOREIGN PATENT DOCUMENTS

| | | |
|---|---|---|
| JP | H01-210615 | 8/1989 |
| JP | 02094451 U | 7/1990 |
| JP | 04086396 A | 3/1992 |
| JP | 09119428 A | 5/1997 |
| JP | 2000120662 * | 4/2000 |
| JP | 2004108509 A | 4/2004 |
| JP | 2005007560 A | 1/2005 |

OTHER PUBLICATIONS

Translation of JP2000-120662 dated Apr. 25, 2000*
JPO, Office Action in Counterpart Application No. JP 2009-184769 dated Mar. 1, 2013.

* cited by examiner

*Primary Examiner* — Alan B Waits
(74) *Attorney, Agent, or Firm* — Blank Rome LLP

(57) ABSTRACT

In a disk drive device according to an embodiment, radial dynamic pressure corresponding portions are structured such that the diameters thereof expand toward the axial outside of the sleeve, and that the shaft is in surface-contact with each of the radial dynamic pressure corresponding portions when the rotational drive of the disk drive device is stopped. Further, a herringbone-shaped radial dynamic pressure groove is formed in each of the radial dynamic pressure corresponding portions. The radial dynamic pressure groove in each radial dynamic pressure corresponding portion is formed such that the axial outside length from the turned-back portion of the herringbone-shape is longer than the axial inside length therefrom.

5 Claims, 7 Drawing Sheets

(A)

(B)

(C)

DISK DRIVE DEVICE

CROSS-REFERENCE TO RELATED APPLICATION

This application is based upon and claims the benefit of priority from the prior Japanese Patent Application No. 2009-184769, filed on Aug. 7, 2009, the entire content of which is incorporated herein by reference.

BACKGROUND OF THE INVENTION

1. Field of the Invention

The present invention relates to a disk drive device that rotationally drives a disk.

2. Description of the Related Art

There are known hard disk drives (HDDs) as media used in storage devices of computers, etc. Such devices for driving recording disks are collectively referred to as disk drive devices. In a disk drive device, a recording disk on which recording tracks for recording magnetic data are formed is rotated at high speed by a brushless motor (hereinafter, simply referred to as a "motor"). A magnetic head for performing read/write of magnetic data stored on the recording disk is arranged above the recording surface of the recording disk so as to create a slight space between the two, and is configured to trace the recording tracks.

A motor of which the disk drive device is composed is generally structured to include: a stator in which an armature coil is provided, a rotor in which a magnet to be arranged so as to face the stator is provided, and a bearing unit configured to rotatably support the rotor relative to the stator. As such motors, there are two types of motors, in one of which the rotor composed of a shaft to be the center of the rotation is rotated while being supported by a sleeve fixed to the stator, and in the other of which the rotor composed of a sleeve is, in contrast, rotated while being supported by a shaft fixed to the stator. The recording disk is fixed to a hub member fixed to the shaft or the sleeve, either of which the rotor is composed of, and is rotated with the hub member at high speed by the drive of the motor. In order to realize high performance of the motor, there are many cases where fluid dynamic bearings are used in the bearing units (see, for example, Japanese Patent Application Publication No. H1-210615).

This fluid dynamic bearing is configured between the aforementioned shaft and sleeve. The shaft has a flange portion at its one end. The sleeve, having a bottomed cylindrical shape, faces in the radial direction the outer circumferential surface of the shaft through a minor space, and also faces in the axial direction the upper surface and the lower surface of the flange portion through a minor space. Oil is injected into each minor space as a lubricant fluid. A pair of radial dynamic pressure corresponding portions, which are spaced apart from each other in the axial direction, are provided on the inner circumferential surface of the sleeve. A radial dynamic pressure groove for generating proper radial dynamic pressure is formed between each radial dynamic pressure corresponding portion and the shaft. On the other hand, thrust dynamic pressure corresponding portions are provided on the upper surface and the lower surface of the flange portion of the shaft. A thrust dynamic pressure groove is formed between each thrust dynamic pressure corresponding portion and the sleeve. When either the shaft or the sleeve starts rotating relative to the other, dynamic pressure is generated in each bearing unit, thereby allowing for the rotor to be rotatably supported in a non-contact state relative to the stator. That is, the rotor is floated by making the pressure in the bearing unit higher than or equal to atmospheric pressure. In recent years, the rotational accuracy of disk drive devices has been drastically improved by comprising these fluid dynamic bearings, thereby allowing for the high density and large capacity of the magnetic data, which can be stored, to be realized. As a result, the disk drive devices have been mounted in various apparatuses, thereby making use environments for the disk drive devices extensive.

Such disk drive devices are demanded to have high reliability regardless of their installation directions, due to the arrangement requirements in accordance with the installation aspects of computers in which the disk drive devices are to be mounted. That is, in the disk drive device provided with such a fluid dynamic bearing, a hub member is generally connected with one end of the shaft or the sleeve, either of which the rotor is composed of. Accordingly, when the shaft is used, in particular, in a horizontal state, the gravity of the hub member is biased to the one end of the shaft, making a so-called cantilever state. Therefore, in particular, when the rotation is stopped in which dynamic pressure does not act, the shaft becomes tilted, causing the tilts of the axes of the shaft and the sleeve to deviate from each other.

The sleeve generally has a slightly tilted structure in which the gap between the radial dynamic pressure corresponding portion and the shaft becomes smaller going from the axial center portion toward the outside of the sleeve, in order to effectively generate dynamic pressure by the shape of the radial dynamic pressure corresponding portion itself and in order not to let out the lubricant. Because the sleeve has such a shape, if the axes of the shaft and the sleeve deviate from each other as stated above, the radial dynamic pressure corresponding portion and the shaft are locally in contact with each other when the rotation is stopped, thereby increasing the surface pressure in the contact portion. That is, in particular, when a disk drive device is installed in a state where the shaft thereof is maintained horizontally, the shaft will be locally in contact with the radial dynamic pressure corresponding portion even if the rotation of the rotor is stopped at any timing, and hence the pressure at the contact is increased. In addition, even if the shaft is not maintained horizontally, local contact pressure, more or less, can be generated when the rotation of the rotor is stopped. Therefore, there has been the problem that, when start/stop of the rotation of the rotor have been repeated in a disk drive device, the radial dynamic pressure corresponding portion is abraded, and accordingly the rotational stability may be impaired and the lifetime of the disk drive device until read/write of data is not performed normally, is shortened.

SUMMARY OF THE INVENTION

The present invention has been made in view of these situations, and a purpose of the invention is to provide a disk drive device in which the lifetime thereof can be maintained to be long even if the rotational axis is tilted when the drive of the disk drive device is stopped, and in which the reliability thereof can be maintained by securing normal operations of reading/writing data.

In order to solve the aforementioned problem, a disk drive device according to an embodiment of the present invention comprises: a base member; and a bearing unit that is arranged on the base member and is configured to rotatably support a recording disk relative to the base member. The bearing unit includes: a shaft to be the center of the rotation of the recording disk; a sleeve configured to house the shaft and to allow relative rotation with the shaft being the axis; a radial space portion formed between the inner wall surface of the sleeve and the outer wall surface of the shaft; a pair of radial dynamic pressure generating portions respectively configured to generate, in the radial space portion, radial dynamic pressures between the inner wall surface near to one end of the sleeve and the outer wall surface of the shaft, and between the inner wall surface near to the other end thereof and the outer wall surface of the shaft, the one end and the other end of the sleeve being defined in the axial direction; and lubricant injected into the radial space portion. The dynamic pressure corresponding portion of the sleeve, which is part of the inner wall surface of the sleeve corresponding to at least one of the pair of the radial dynamic pressure generating portions, is provided such that the diameter of the dynamic pressure corresponding portion of the sleeve expands toward the axial outside of the sleeve.

Herein, the "to allow relative rotation" means that the case where each of the shaft and the sleeve is a rotating body can be included. That is, the bearing unit may be a type in which the shaft is rotated or a type in which the sleeve is rotated. In addition, the "radial dynamic pressure generating portion" means a portion where radial dynamic pressure is generated between the shaft and the sleeve, and the "dynamic pressure corresponding portion" stated herein means a portion of the sleeve. The "radial dynamic pressure generating portion" may be one in which dynamic pressure is increased by the shape of the sleeve, or one in which a radial dynamic pressure groove for generating radial dynamic pressure is further formed on at least one of the shaft and the sleeve. The "dynamic pressure corresponding portion" may be one in which the diameter thereof expands toward the axial outside of the sleeve by forming a tapered surface.

According to the embodiment, the diameter of the dynamic pressure corresponding portion expands toward the axial outside of the sleeve, the dynamic pressure corresponding portion corresponding to, on the inner wall surface of the sleeve, at least one of the pair of the radial dynamic pressure generating portions. Accordingly, even if the axes of the shaft and the sleeve deviate from each other when the rotation is stopped, with the disk drive device being installed in a manner in which the axis of the shaft deviates from the vertical direction, a contact area with the shaft can be held to be large in the dynamic pressure corresponding portion having the shape in which the diameter thereof expands. That is, the pressure, occurring when the shaft and the sleeve are in contact with each other, can be suppressed. As a result, even when start/stop of the rotation have been repeated, abrasion of the dynamic pressure corresponding portion can be suppressed. As a result, the lifetime of the disk drive device can be maintained to be long, and the reliability thereof can be maintained by securing normal operations of reading/writing data. It is desirable that the dynamic pressure corresponding portions, corresponding to both of the pair of the radial dynamic pressure generating portions, respectively have shapes in which the diameters thereof expand toward the axial outside of the sleeve, in terms of suppressing the abrasion of the dynamic pressure corresponding portion as stated above.

Another embodiment of the present invention is also a disk drive device. The device comprises: a base member; and a bearing unit that is arranged on the base member and is configured to rotatably support a recording disk relative to the base member. The bearing unit includes: a shaft to be the center of the rotation of the recording disk; a sleeve configured to house the shaft and to allow relative rotation with the shaft being the axis; a radial space portion formed between the inner wall surface of the sleeve and the outer wall surface of the shaft; a pair of radial dynamic pressure generating portions respectively configured to generate, in the radial space portion, radial dynamic pressures between the inner wall surface near to one end of the sleeve and the outer wall surface of the shaft, and between the inner wall surface near to the other end thereof and the outer wall surface of the shaft, the one end and the other end of the sleeve being defined in the axial direction; and lubricant injected into the radial space portion. The dynamic pressure corresponding portion, which is part of the outer wall surface of the shaft corresponding to at least one of the pair of the radial dynamic pressure generating portions, is provided such that the diameter of the dynamic pressure corresponding portion is reduced toward the axial outside of the sleeve.

Herein, the "to allow relative rotation" and the "radial dynamic pressure generating portion" mean those as stated above. On the other hand, the "dynamic pressure corresponding portion" stated herein means a portion of the shaft. The "radial dynamic pressure generating portion" may be one in which dynamic pressure is increased by the shape of the shaft, or one in which a radial dynamic pressure groove for generating radial dynamic pressure is further formed on at least one of the shaft and the sleeve. The "dynamic pressure corresponding portion" may be one in which the diameter thereof is reduced toward the axial outside of the sleeve by forming a tapered surface.

According to the embodiment, the diameter of the dynamic pressure corresponding portion is reduced toward the axial outside of the sleeve, the dynamic pressure corresponding portion corresponding to, on the outer wall surface of the shaft, at least one of the pair of the radial dynamic pressure generating portions. Accordingly, even if the axes of the shaft and the sleeve deviate from each other when the rotation is stopped, with the disk drive device being installed in a manner in which the axis of the shaft deviates from the vertical direction, a contact area with the sleeve can be held to be large in the dynamic pressure corresponding portion having the shape in which the diameter thereof is reduced. That is, the pressure, occurring when the shaft and the sleeve are in contact with each other, can be suppressed. As a result, even when start/stop of the rotation have been repeated, abrasion of the dynamic pressure corresponding portion can be suppressed. As a result, the lifetime of the disk drive device can be maintained to be long, and the reliability thereof can be maintained by securing normal operations of reading/writing data. It is desirable that the dynamic pressure corresponding portions, corresponding to both of the pair of the radial dynamic pressure generating portions, respectively have shapes in which the diameters thereof are reduced toward the axial outside of the sleeve, in terms of suppressing the abrasion of the dynamic pressure corresponding portion as stated above.

BRIEF DESCRIPTION OF THE DRAWINGS

Embodiments will now be described, by way of example only, with reference to the accompanying drawings, which are meant to be exemplary, not limiting, and wherein like elements are numbered alike in several figures, in which.

DETAILED DESCRIPTION OF THE INVENTION

The invention will now be described by reference to the preferred embodiments. This does not intend to limit the scope of the present invention, but to exemplify the invention.

Hereinafter, embodiments of the present invention will be described based on the accompanying drawings. The present embodiment is used in a brushless motor for driving a recording disk, the brushless motor being mounted in a hard disk drive apparatus (hereinafter, sometimes and simply referred to as an "HDD" or "disk drive device"), or used in a disk drive motor, etc., which is to be mounted in an optical disk recording and reproducing device, such as a CD (Compact Disc) device and a DVD (Digital Versatile Disc) device.

Figure 1:
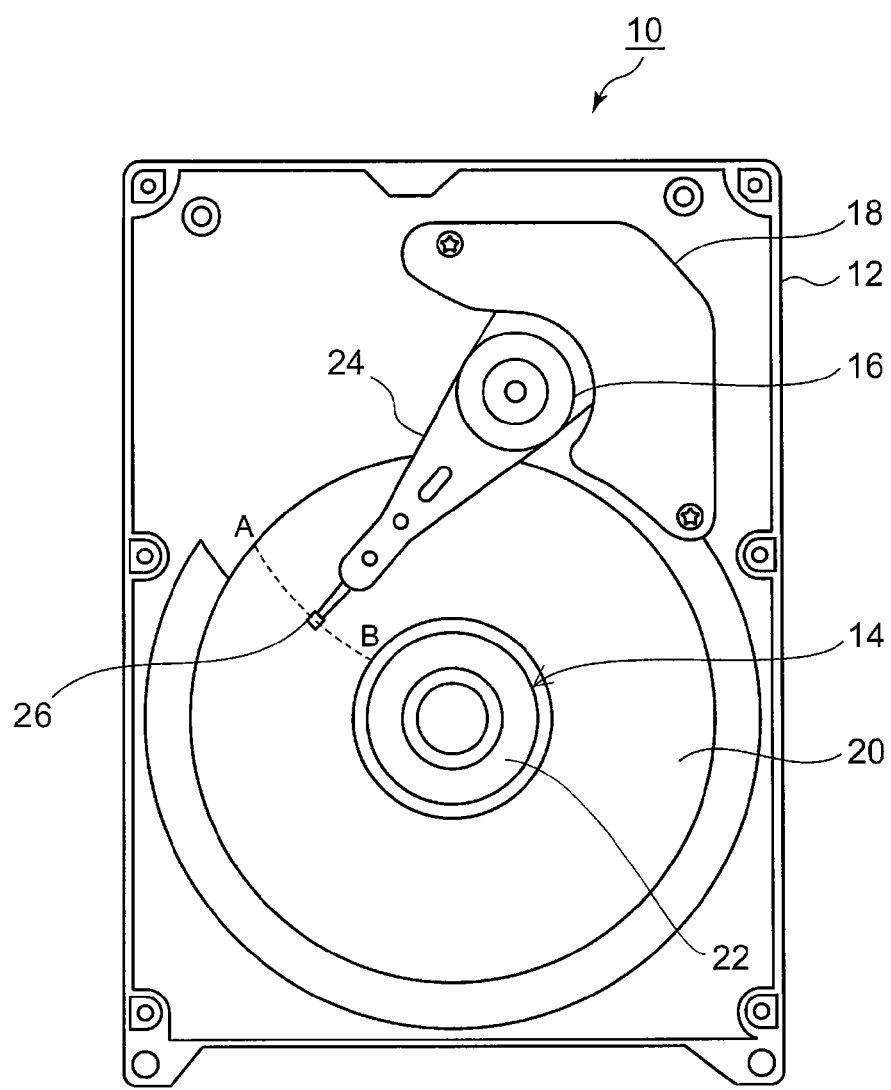
FIG. 1 is a view illustrating the internal structure of a disk drive device according to the present embodiment.

FIG. 1 is a view illustrating the internal structure of a disk drive device according to the present embodiment. FIG. 1 illustrates a state in which a cover has been removed in order to expose the internal structure. The disk drive device 10 is structured as an HDD, and a brushless motor 14, an arm bearing unit 16, and a voice coil motor 18, etc., are mounted on the upper surface of a base member 12. The brushless motor 14 supports, on the rotational axis, a hub member 22 on which a recording disk 20 is mounted, thereby rotational driving the recording disk 20 on which data can be stored, for example, magnetically. The brushless motor 14 can be, for example, a spindle motor. The brushless motor 14 is driven with a three-phase drive current consisting of a U-phase, a V-phase, and a W-phase, passing through. The arm bearing unit 16 supports a swing arm 24 in a swing-free manner within a movable range AB. The voice coil motor 18 makes the awing arm 24 swing in accordance with an external control command. A magnetic head 26 is fixed to the tip of the swing arm 24. When the disk drive device 10 is in an operation state, the magnetic head 26 moves, with the swing of the swing arm 24, within the movable range AB via a slight space with the surface of the recording disk 20, thereby reading/writing data. It is noted that, in FIG. 1, the point A corresponds to the position at the outermost recording track of the recording disk 20 and the point B to the position at the innermost recording track thereof. The swing arm 24 may be transferred to a waiting position provided on the side of the recording disk 20 when the disk drive device 10 is in a stopped state.

In the present embodiment, a device including all of the components for reading/writing magnetic data, such as the recording disk 20, the swing arm 24, the magnetic head 26, and the voice coil motor 18, etc., is sometimes expressed as a disk drive device, or as an HDD. Alternatively, only the part for rotationally driving the recording disk 20 is sometimes expressed as a disk drive device.

Figure 2:
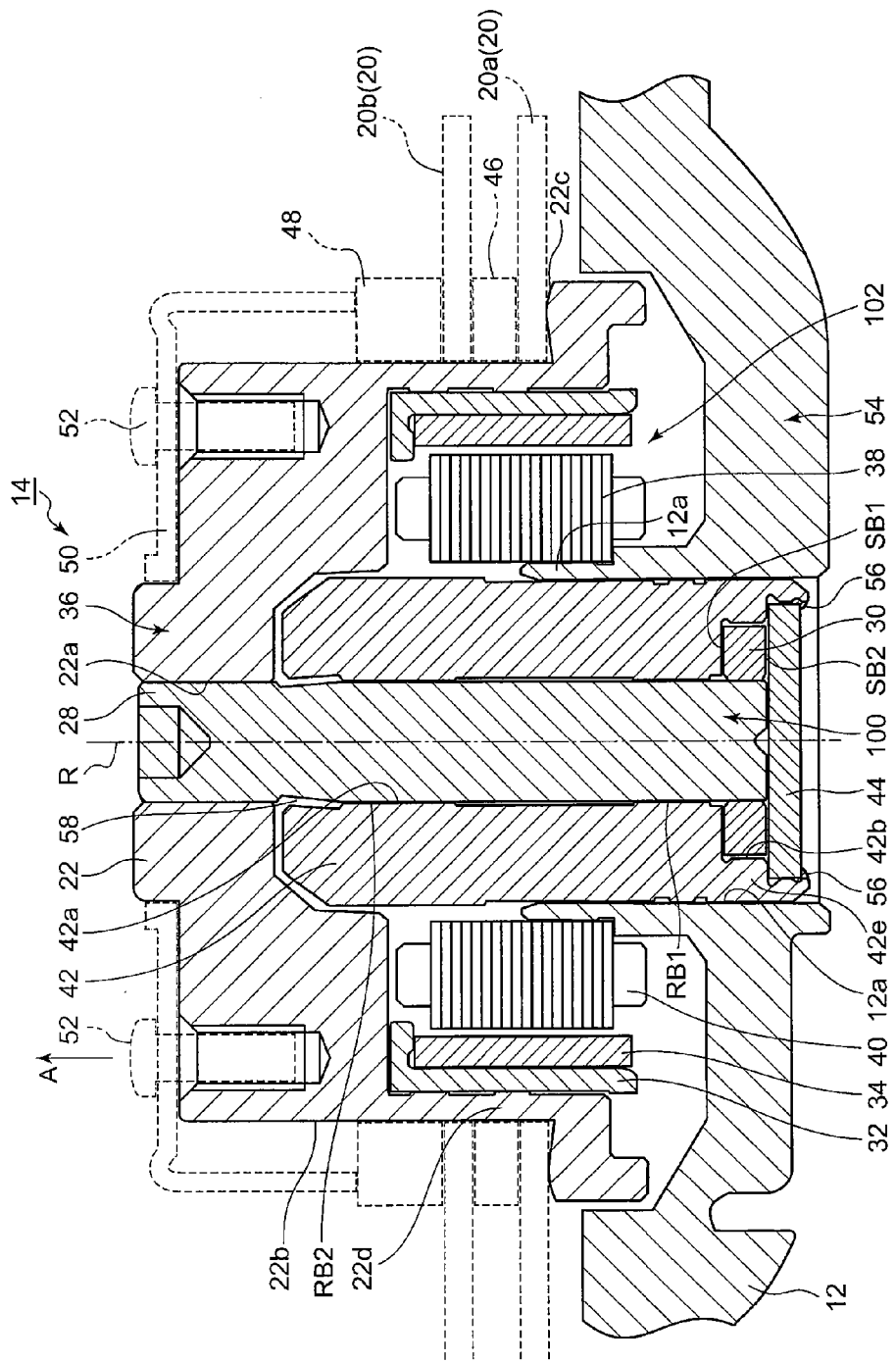
FIG. 2 is a schematic cross-sectional view of a brushless motor in the disk drive device.

FIG. 2 is a schematic cross-sectional view of the brushless motor in the disk drive device. The brushless motor 14 rotates, for example, two 3.5"-recording disks 20 each having a diameter of approximately 95 mm, which are to be mounted in the disk drive device 10. In this case, the diameter of the central hole of each of the two recording disks 20 is 25 mm, and the thickness of the recording disk 20 is 1.27 mm. In the brushless motor 14, a rotor 36 functioning as a rotating body is composed of the hub member 22 having an approximately cup-like shape, the shaft 28, a flange 30, a yoke 32, and a cylindrical magnet 34. Specifically, one end of the shaft 28 is fixed to an opening 22a provided at the center of the hub member 22 with a combination of press-fitting and adhesion. The flange 30 is fixed to the other end of the shaft 28 in a press-fitting state. Accordingly, the rotor 36 is integrally rotated around the motor rotational axis R during the rotation of the brushless motor 14.

The hub members 22 is a component whose outer shape around the motor rotational axis R is convex-shaped. The brushless motor 14 according to the present embodiment is structured as a type in which the two recording disks 20 are mounted on the hub member 22. The central holes of the two recording disks 20a and 20b are fit into the outer cylinder surface 22b of the cylinder portion of the hub member 22, the cylinder portion protruding in the arrow A direction of the view. In the present embodiment, the arrow A direction of the view is sometimes referred to as the "upper direction" or "upper surface side", for convenience of descriptions; however, it is needless to say that the positional relationship or the direction thereof is relative and varies according to the direction where the disk drive device 10 is installed. Of the two recording disks 10, the recording disk 20a is seated on a seating portion 22c protruding in the radial direction from the end portion of the outer cylinder portion 22b of the hub member 22. A first annular spacer 46 is arranged between the recording disks 20a and 20b. The first spacer 46 supports the recording disk 20b relative to the seating portion 22c. A second spacer 48 is arranged near to the upper surface of the recording disk 20b, the second spacer 48 being press-fixed by a clamper 50 for fixing the two recording disks 20. The clamper 50 is fixed to the hub member 22 with a plurality of clamp screws 52. In the present embodiment, the diameter of the outer cylinder surface 22b of the hub member 22 is, for example, 25 mm.

The hub member 22 has a cylindrical partition wall portion 22d sandwiched by the yoke 32 and the two recording disks 20a and 20b. The yoke 32 has an L-letter-shaped cross-sectional shape and is formed of a magnetic material such as iron. The yoke 32 is fixed to the inner circumferential surface of the partition wall portion 22d with a combination of adhesion and press fitting. A plurality of convex portions, against which the yoke 32 is pressed when the yoke 32 is being press-fit, are formed on the inner circumferential surface of the partition wall portion 22d. By applying an appropriate amount of adhesive to the inner circumferential surface of the partition wall portion 22d and by press-fitting the yoke 32 into the hub member 22, the adhesive is injected between the inner circumferential surface of the partition wall portion 22d and the outer circumferential surface of the yoke 32, thereby acquiring uniform bonding strength.

Further, the cylindrical magnet 34 is fixed to the inner circumferential surface of the yoke 32 with adhesion. The cylindrical magnet 34 is formed of a rare earth metal, such as neodymium, iron, and boron and is arranged so as to be able to face, in the radial direction, for example, twelve salient poles that are formed on a laminated core 38. The cylindrical magnet 34 is provided with an n-pole drive magnetization in the circumferential direction (where n is an even number greater than or equal to 2). That is, the cylindrical magnet 34 is fixed to the hub member 22 through the yoke 32.

In the brushless motor 14 according to the present embodiment, a stator 54 functioning as a fixed body is composed of the base member 12, the laminated core 38, a coil 40, a sleeve 42, and a counter plate 44. The stator 54 rotatably supports the rotor 36 while the brushless motor 14 is being rotated. The base member 12 can also serve as the housing of the disk drive device 10. A cylindrical portion 12a centered on the motor rotational axis R is provided on the base member 12, and the sleeve 42 is fixed to the inner circumferential surface of the cylindrical portion 12a with adhesion. The sleeve 42 has a cylinder hollow-shaped housing portion 42a and further has a flange housing space portion 42b in its end portion, the flange housing space portion 42b being formed continuously with the sleeve 42 and being configured to rotatably house the flange 30 fixed to the end portion of the shaft 28. The flange housing space portion 42b is defined by a flange surrounding wall portion 42e that is formed continuously with the sleeve 42 and formed in the radial outside of the flange 30. That is, the shaft 28 to which the flange 30 is fixed is rotatably housed within the sleeve 42 including the housing portion 42a and the flange housing space portion 42b. In addition, the counter plate 44 is fixed, with the adhesive 56, to the end surface of the flange surrounding wall portion 42e by which the flange housing space portion 42b of the sleeve 42 is defined. Alternatively, the base member 12 may be a body separate from the housing of the HDD.

Lubricant is injected between the shaft 28 and the sleeve 42 and between the flange 30 and the counter plate 44, in which the shaft 28 and the flange 30 are included in the rotor 36, and the sleeve 42 and the counter plate 44 are included in the stator 54. The bearing unit 100 rotatably supporting the hub member 22 is composed of the shaft 28, the flange 30, the lubricant, the sleeve 42, and the counter plate 44.

The sleeve 42 is obtained by cutting, etc., a copper alloy or a stainless steel material, and a pair of radial dynamic pressure corresponding portions RB1 and RB2, spaced apart from each other in the axial direction (up-down direction of the view), are circumferentially provided on the inner circumferential surface of the sleeve 42. Because the cutting resistance becomes small when the sleeve 42 is formed of a copper alloy, micro processing of a radial dynamic pressure groove, etc., which will be described later, can be easily performed. Further, the corrosion resistance becomes excellent when the sleeve 42 is formed of a stainless steel material, it becomes unnecessary to perform plating separately.

Each radial dynamic pressure corresponding portion slightly protrudes inward in the radial direction on the inner circumferential surface of the sleeve 42, and a herringbone-shaped radial dynamic pressure groove for generating dynamic pressure is formed on the inner circumferential surface thereof. The specific structures of the radial dynamic pressure corresponding portions RB1 and RB2 will be described later. On the other hand, a thrust dynamic pressure corresponding portion SB1 is provided on the surface of the flange 30, the surface thereof facing the sleeve 42 in the thrust direction (the surface is referred to as the sleeve-facing surface), and a thrust dynamic pressure corresponding portion SB2 is provided on the surface facing the counter plate 44 in the thrust direction (the surface is referred to as the counter plate-facing surface). A herringbone-shaped thrust dynamic pressure groove for generating dynamic pressure is formed on each thrust dynamic pressure corresponding portion.

When the brushless motor 14 is being rotated, the shaft 28 and the flange 30 are spaced apart from the surrounding wall surfaces by dynamic pressures generated with these dynamic pressure grooves and the lubricant, and the rotor 36 is supported, in a non-contact state, in the radial direction and the thrust direction. In the present embodiment, the radial dynamic pressure groove is formed in each radial dynamic pressure corresponding portion of the sleeve 42; however, in a variation, the radial dynamic pressure groove may be formed on the outer wall surface of the shaft 28, the outer wall surface thereof facing each radial dynamic pressure corresponding portion of the sleeve 42. Alternatively, the radial dynamic pressure grooves may be formed on both of each radial dynamic pressure corresponding portion of the sleeve 42 and the surface of the shaft 28, the surface thereof facing each radial dynamic pressure corresponding portion. Similar radial dynamic pressure can be generated in such ways. In the present embodiment, the thrust dynamic pressure groove is formed on each thrust dynamic pressure corresponding portion of the flange 30; however, in a variation, the thrust dynamic pressure grooves may be formed on the surfaces of the sleeve 42 and the counter plate 44, the surfaces thereof respectively facing each thrust dynamic pressure corresponding portion of the flange 30. Alternatively, the thrust dynamic pressure grooves may be formed on both of each thrust dynamic pressure corresponding portion of the flange 30 and the surfaces of the sleeve 42 and the counter plate 44, the surfaces thereof respectively facing each thrust dynamic pressure corresponding portion. Similar thrust dynamic pressure can be generated in such ways.

A capillary seal portion 58 in which the space between the inner circumferential surface of the sleeve 42 and the outer circumferential surface of the shaft 28 gradually expands towards the upper direction, is formed near to the open end of the sleeve 42. The capillary seal portion 58 has a function of preventing, by capillarity, the lubricant from leaking out of the injected portions.

The laminated core 38 has an annular portion and twelve salient poles extending to the radial outside from the annular portion. The laminated core 38 is formed by laminating, for example, eighteen thin electromagnetic steel plates and by integrating them with laser welding, etc. The coil 40 is wound around each salient pole. A drive magnetic flux is generated along the salient poles by flowing a three-phase drive current with an approximately sine wave shape through the coil 40. The inner circumferential surface of the annular portion of the laminated core 38 is fit, with a clearance fit, in the outer circumferential surface of the cylindrical portion 12a of the base member 12, and is fixed thereto with adhesive, etc. A drive unit 102 is composed of the laminated core 38, the coil 40, and the cylindrical magnet 34.

In the brushless motor 14 structured as stated above, when a drive current is supplied to the coil 40, a drive magnetic flux is generated along the twelve salient poles and torque in the rotation direction is provided to the cylindrical magnet 34, thereby rotating the whole rotor 36. When the shaft 28 is rotated relative to the sleeve 42, radial dynamic pressure is generated such that the shaft 28 is supported in a non-contact state relative to the sleeve 42. In addition, when the flange 30 is rotated relative to the sleeve 42 and the counter plate 44, thrust dynamic pressure is generated such that the flange 30 is supported, in a non-contact state, between the sleeve 42 and the counter plate. As a result, the rotor 36 is rotated while being supported in a non-contact state relative to the stator 54.

Figure 3:
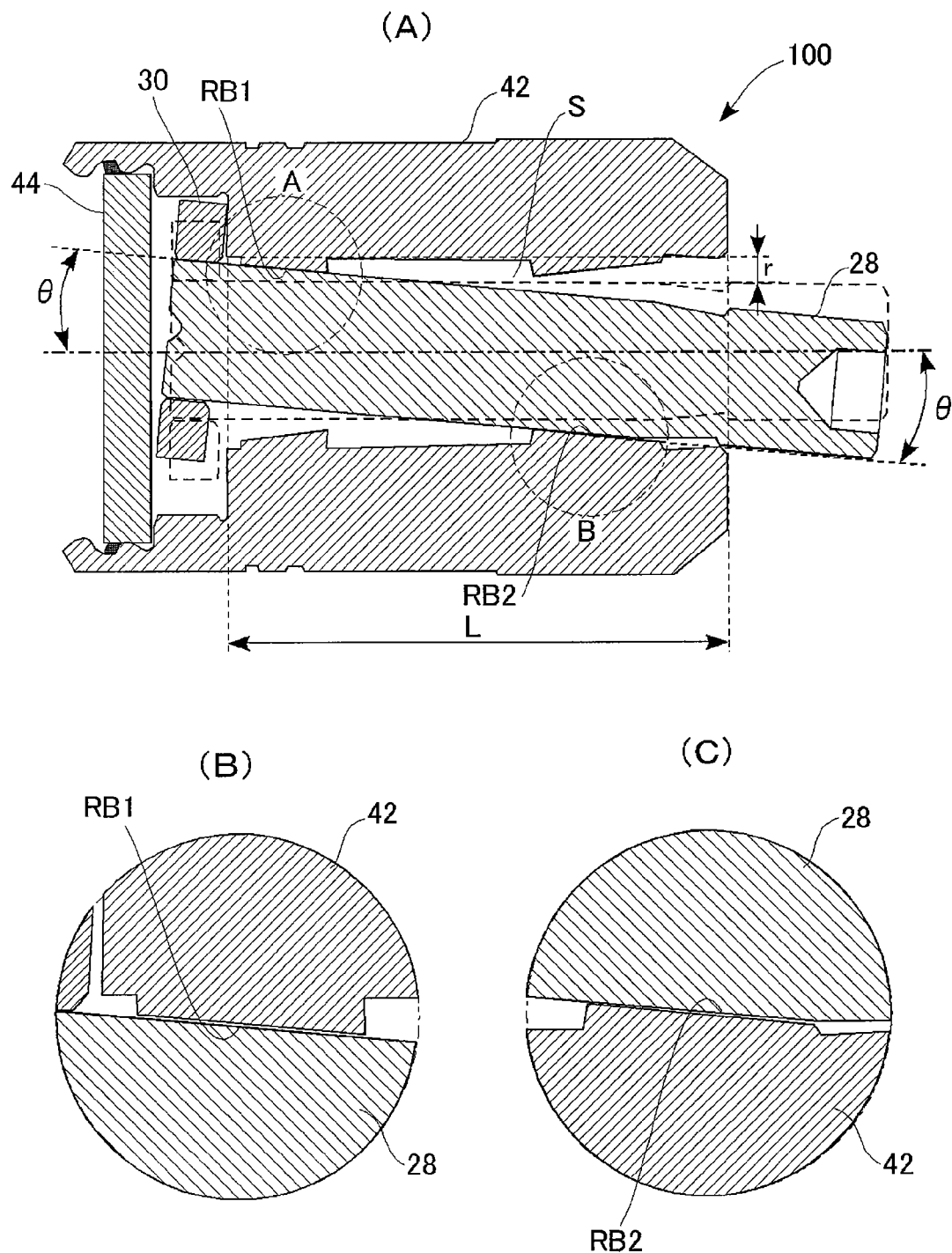
FIG. 3A is a cross-sectional view illustrating the outline structure of the major portion of a bearing unit.
FIG. 3B is a cross-sectional view illustrating the outline structure of the major portion of the bearing unit.
FIG. 3C is a cross-sectional view illustrating the outline structure of the major portion of the bearing unit.
Figure 4:
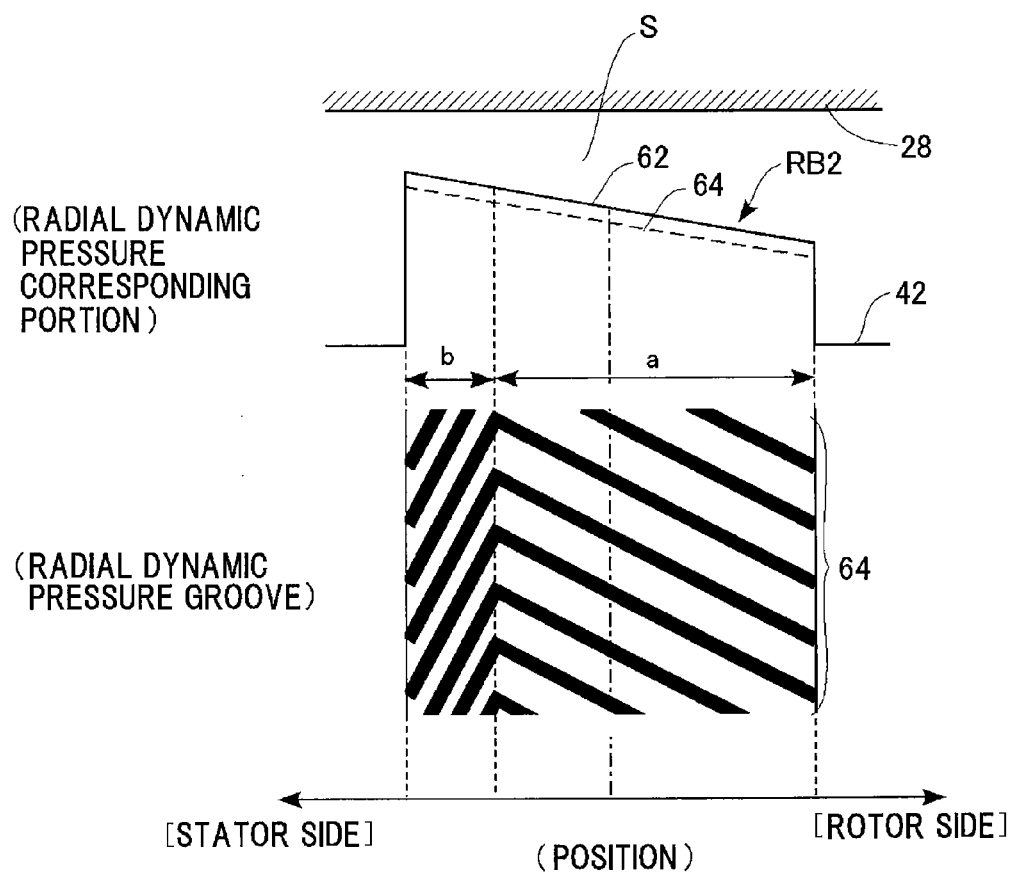
FIG. 4 is a view illustrating the structure of the bearing unit.

Subsequently, the structure and operation of the major portion of the bearing unit 100 according to the present embodiment will be described, while compared to a comparative example. FIGS. 3A to 3C are cross-sectional views illustrating the outline structures of the major portions the bearing unit according to the present embodiment. FIG. 3A illustrates the major portion of the bearing unit, FIG. 3B illustrates an enlarged view of the A portion in FIG. 3A, and FIG. 3C illustrates an enlarged view of the B portion in FIG. 3A. In the present embodiment, it is assumed that the disk drive device 10 is installed such that the rotational axis thereof is maintained to be approximately horizontal, and hence the illustrated bearing unit 100 shows an aspect in which the disk drive device 10 of FIG. 2 is tilted at 90°. FIG. 4 is a view illustrating an operation effect obtained by the structure of the bearing unit according to the present embodiment. In the view, the shape of the radial dynamic pressure corresponding portion and that of the radial dynamic pressure groove are respectively illustrated from the top. The horizontal axis of the view represents axial positions in the radial dynamic pressure corresponding portion, in which the left side of the view represents the stator side (namely, the inner side of the bearing unit 100) and the right side thereof represents the rotor side (namely, the outer side of the bearing unit 100).

As illustrated in FIG. 3A, in the bearing unit 100 according to the present embodiment, when it is assumed that: the length between both ends of the sleeve 42 in the radial space portion S formed between the inner wall surface of the sleeve 42 and the outer wall surface of the shaft 28, is L; the clearance between the open end portion of the sleeve 42 and the shaft 28 when the shaft 28 is being rotated, is r; and the tilt of the shaft 28 relative to the axis of the sleeve 42 when the shaft 28 is not being rotated, is θ, the tilts of the tapered surfaces of the radial dynamic pressure corresponding portions RB1 and RB2 are set so as to satisfy the relationship of $0<\tan\theta<2r/L$. As a result, it is designed that the respective open end portions at both ends of the sleeve 42 in the radial space portion S are not in contact with the shaft 28 even when the relative rotation between the shaft 28 and the sleeve 42 is not being performed. As illustrated by the dashed line in the view, the axes of the shaft 28 and the sleeve 42 are designed to be approximately in line with each other by the radial dynamic pressure while the shaft 28 is being rotated.

When the rotational drive of the disk drive device 10 is stopped, that is, when the relative rotation between the shaft 28 and the sleeve 42 is not being performed, the shaft 28 is in surface-contact with each of the pair of the radial dynamic pressure corresponding portions RB1 and RB2 at positions opposite to the axis of the shaft 28, with such tapered shapes of the radial dynamic pressure corresponding portions RB1 and RB2. That is, even when the shaft 28 is rotated in a state of being tilted relative to the sleeve 42 due to the cantilever structure occurring when the rotation of the disk drive device 10 is stopped or initiated, stable support of the shaft 28 can be maintained.

In addition, herringbone-shaped radial dynamic pressure grooves for increasing radial dynamic pressure are formed in the radial dynamic pressure corresponding portions RB1 and RB2. For convenience of description, FIG. 4 corresponds to FIG. 3C and exemplifies the structure and operation of the radial dynamic pressure corresponding portion RB2, which is one of both the radial dynamic pressure corresponding portions. As illustrated in the top of the view, the radial dynamic pressure corresponding portion RB2 has a tapered surface 62 whose diameter expands going from the inside toward the outside of the radial space portion S. A herringbone-shaped radial dynamic pressure groove 64 is formed on the tapered surface 62. As the surface of the tapered surface 62 is illustrated in the middle of the view, the radial dynamic pressure groove 64 is processed into a herringbone-shape by cutting, etc., and is formed such that each turned-back portion is arranged along the circumferential direction of the radial dynamic pressure corresponding portion RB2.

It is also possible that the radial dynamic pressure groove in each radial dynamic pressure corresponding portion is set to be neutral to the lubricant. However, a pump-in state or a pump-out state sometimes occurs due to variations in production. If the dynamic pressure corresponding portion becomes a pump-out state, the force acts so as to push out the lubricant outside the sleeve. When the lubricant is pushed out, the dynamic pressure corresponding portion becomes a state where the lubricant is lacking, and hence the lifetime of the device is shortened. To deal with this problem, it may be possible that a radial dynamic pressure groove for generating radial dynamic pressure in the dynamic pressure corresponding portion of the sleeve is formed such that the point where the maximum radial dynamic pressure is generated by the radial dynamic pressure groove in the dynamic pressure corresponding portion, is located inward of the axial center of the dynamic pressure corresponding portion. With this structure, the radial dynamic pressure groove in the dynamic pressure corresponding portion is set to be in the pump-in state relative to the lubricant. As a result, the pump-out state hardly occurs even if there is a variation in production, allowing for the aforementioned problem to be reduced.

When the radial dynamic pressure groove is processed into a herringbone-shape, the point where the maximum radial dynamic pressure is generated by the radial dynamic pressure groove is located at the turned-back portion of the herringbone-shape. Accordingly, it may be possible that the axial outside length a from the turned-back portion of the herringbone-shape in the radial dynamic pressure corresponding portion RB2 is larger than the axial inside length b therefrom. This is desirable also in terms of easy processing. FIG. 4 illustrates that the axial outside length a from the turned-back portion of the herringbone-shape in the radial dynamic pressure corresponding portion RB2 is formed to be larger than the axial inside length b therefrom.

Figure 5:
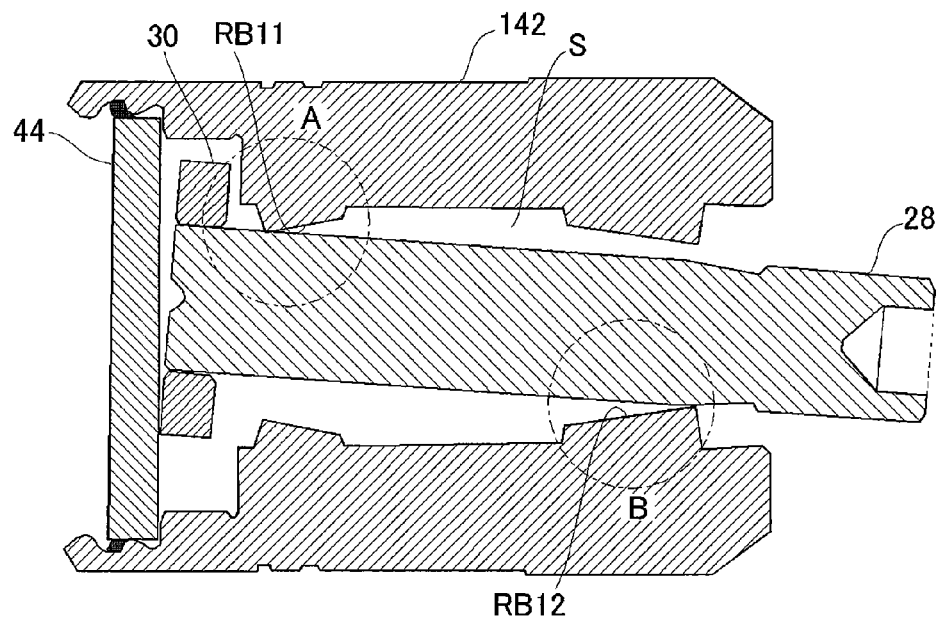
FIG. 5A is a cross-sectional view illustrating the outline structure of the major portion of a bearing unit in a comparative example.
FIG. 5B is a cross-sectional view illustrating the outline structure of the major portion of the bearing unit in the comparative example.
FIG. 5C is a cross-sectional view illustrating the outline structure of the major portion of the bearing unit in the comparative example.
Figure 5:
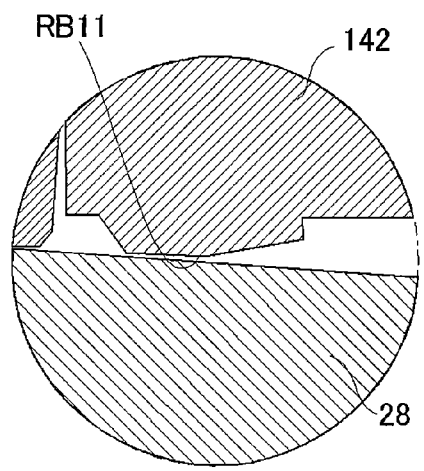
Figure 5:
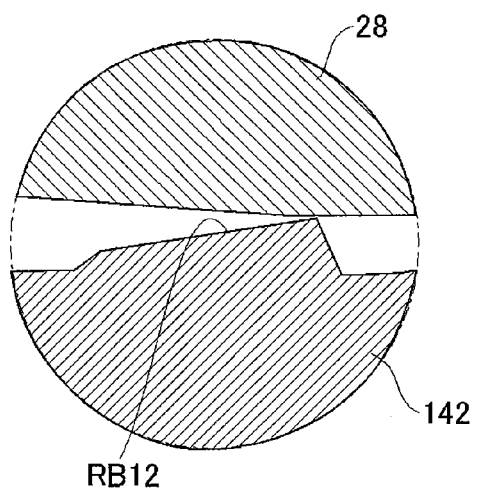

FIGS. 5A to 5C are cross-sectional views illustrating the outline structures of the major portions of a bearing unit in a comparative example. FIG. 5A illustrates the major portion of the bearing unit, FIG. 5B illustrates an enlarged view of the A portion in FIG. 5A, and FIG. 5C illustrates an enlarged view of the B portion in FIG. 5A.

As illustrated in FIG. 5A, because radial dynamic pressure corresponding portions RB11 and RB12 have tapered shapes whose diameters are reduced going from the inside toward the outside of a radial space portion S, the outside end portion of each radial dynamic pressure corresponding portion is locally in contact with a shaft 28 (approximately line-contact) when the rotational drive of the disk drive device is stopped, namely, when the relative rotation between the shaft 28 and the sleeve 42 is not being performed, as also illustrated in FIGS. 5B and 5C. Accordingly, when the rotation of the disk drive device is stopped or the rotation thereof is initiated, the pressure occurring in the contact portion locally becomes large, causing abrasion of the disk drive device. That is, the abrasion thereof progresses every time the disk drive device is initiated and stopped, thereby possibly shortening the lifetime of the disk drive device. In other words, in the aforementioned embodiment, occurrence of such abrasion can be suppressed by forming the radial dynamic pressure corresponding portion so as to have a shape whose diameter expands going from the inside toward the outside of the radial space portion S.

As stated above, in the disk drive device 10 according to the present embodiment, the radial dynamic pressure corresponding portions RB1 and RB2 are made to have the structures whose diameters expand toward the axial outside of the sleeve 42 such that the shaft 28 is in surface-contact with the respective radial dynamic pressure corresponding portions RB1 and RB2 when the rotational drive of the disk drive device 10 is stopped. As a result, even if start/stop of the rotation of the disk drive device 10 are repeated, abrasion of each radial dynamic pressure corresponding portion can be suppressed, thereby allowing for the lifetime as the disk drive device 10 to be maintained to be long. Further, by forming the herringbone-shaped radial dynamic pressure groove 64 such that the axial outside length from the turned-back portion of the herringbone-shape is larger than the axial inside length therefrom, the pump-out state hardly occurs even if there is a variation in production, but the pump-in state is secured, thereby allowing for the bearing function by the bearing unit 100 to be stably maintained.

When the radial dynamic pressure groove is formed into a herringbone-shape, a radial dynamic pressure groove with a larger depth generates higher dynamic pressure. Accordingly, the radial dynamic pressure groove may be formed such that the axial outside depth d1 from the turned-back portion of the herringbone-shape is larger than the axial inside depth d2 therefrom. As a result, the pump-out state hardly occurs even if there is a variation in production, thereby allowing for the aforementioned problem to be reduced.

Figure 6:
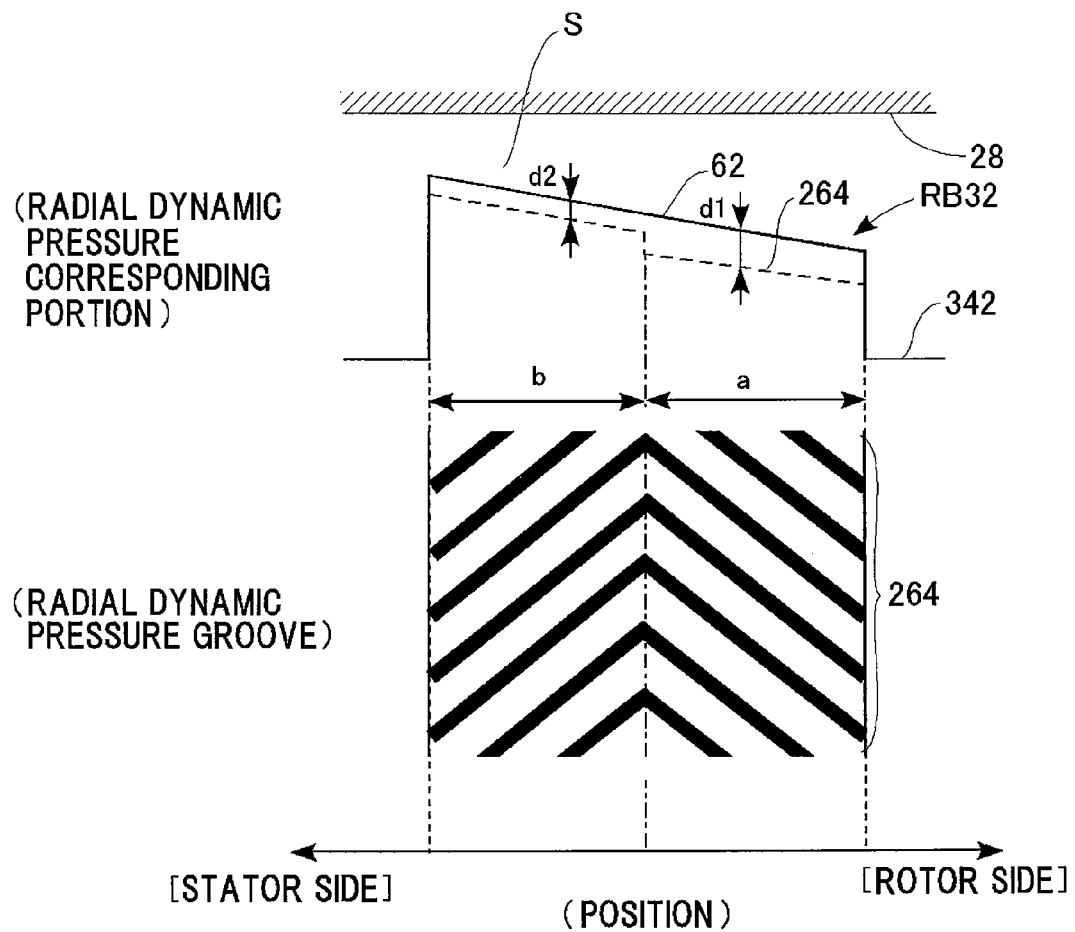
FIG. 6 is a view illustrating the structure of a bearing unit according to a variation.
Figure 7:
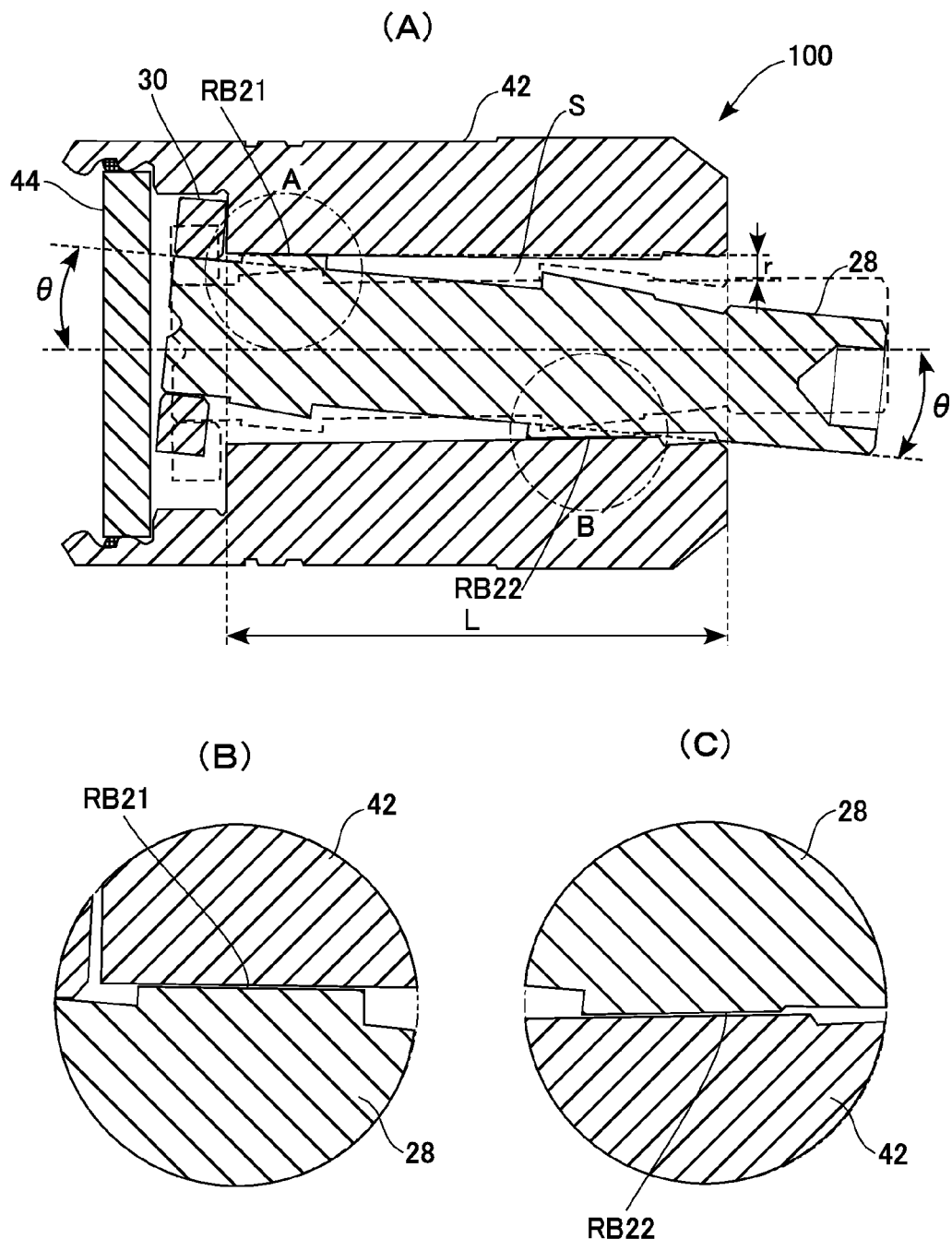
FIG. 7A is a cross-sectional view illustrating the outline structure according to a variation of FIG. 3A.
FIG. 7B is a cross-sectional view illustrating the outline structure of a portion of FIG. 7A according to a variation of FIG. 3B.
FIG. 7C is a cross-sectional view illustrating the outline structure of another portion of FIG. 7A according to a variation of FIG. 3C.

FIG. 6 is a view illustrating an operation effect obtained by the structure of a bearing unit according to a variation. The view corresponds to FIG. 4 and the shape of the radial dynamic pressure corresponding portion and that of the radial dynamic pressure groove are respectively illustrated from the top. The horizontal axis of the view represents axial positions in the radial dynamic pressure corresponding portion. In the view, components approximately similar to those in the aforementioned embodiments are denoted with the same reference numerals.

In the aforementioned embodiments, a so-called outer-rotor brushless motor has been described, in which the cylindrical magnet 34 is located outside the laminated core 38; however, similar effects can be obtained in a so-called inner-rotor brushless motor in which, for example, the magnet is located inside the laminated core. In the aforementioned embodiments, a motor is exemplified in which the shaft 28 is fixed to the hub member 22 to structure the rotor, and is rotated while being supported by the sleeve 42 fixed to the stator; however, a motor can be adopted in which, in contrast, the sleeve is fixed to the hub member to structure the rotor, and is rotated while being supported by the shaft fixed to the stator.

Further, in the aforementioned embodiments, the case where the laminated core is used has been described; however, the core is not limited to a laminated core. Further, the structure of the brushless motor 14 for an HDD has been described in each embodiment. Other than that, the technique according to the present embodiment can also be applied in a disk drive motor to be mounted in an optical disk recording and reproducing device, such as a CD device or a DVD device, etc., which can provide similar effects.

In the aforementioned embodiments, the case has been described in which the radial dynamic pressure corresponding portion protruding inward in the radial direction is provided on the sleeve 42. In a variation, the radial dynamic pressure corresponding portion protruding outward in the radial direction may be provided on the shaft and structured such that the diameter of the radial dynamic pressure corresponding portion is reduced toward the axial outside of the sleeve. Also, in this case, it is desirable that a herringbone-shaped radial dynamic pressure groove is formed in each radial dynamic pressure corresponding portion and that the axial outside length from the turned-back portion of the herringbone-shape is larger than the axial inside length therefrom.

The present invention should not be limited to the aforementioned embodiments, and various modifications, such as design modifications, can be made with respect to the above embodiments based on the knowledge of those skilled in the art. The structure illustrated in each view is intended to exemplify an example, and the structure can be appropriately modified to a structure having a similar function, which can provide similar effects.

What is claimed is:

1. A disk drive device comprising:
a base member; and
a bearing unit that is arranged on the base member and is configured to rotatably support a recording disk relative to the base member, wherein the bearing unit includes:
a shaft to be the center of the rotation of the recording disk;
a sleeve configured to house the shaft and to allow relative rotation with the shaft being the axis;
a radial space port on formed between an inner wall surface of the sleeve and an outer wall surface of the shaft;
a pair of radial dynamic pressure generating portions spaced apart in an axial direction and respectively configured to generate, in the radial space portion, radial dynamic pressure between the inner wall surface near to one end of the sleeve and the outer wall surface of the shaft, and between the inner wall surface near to the other end of the sleeve and the outer wall surface of the shaft, the one end and the other end of the sleeve being defined in the axial direction, each of said radial dynamic pressure generating portions including a sleeve dynamic pressure corresponding portion that is part of the inner wall surface of the sleeve and a shaft dynamic pressure corresponding portion that is part of the outer wall surface of the shaft; and
wherein lubricant is interposed in each of said radial dynamic pressure generating portions,
a herringbone-shaped radial dynamic pressure groove for generating a radial dynamic pressure in the lubricant is formed in at least one of the radial dynamic pressure generating portions, and
each sleeve dynamic pressure corresponding portion forms a tapered surface such that an inner diameter expands over the entirety of the herringbone-shaped radial dynamic pressure groove including a turned-back portion thereof;
wherein a hub configured to mount the recording disk is connected with one end portion of the sleeve or the shaft,
wherein the diameter of each sleeve dynamic pressure corresponding portion expands toward an axial outside of the sleeve, and the tapered surface of each sleeve dynamic pressure corresponding portion, respectively, is formed to have a same angle relative to an axial direction of the sleeve, and
wherein the angle is set such that, when the relative rotation between the shaft and the sleeve is not being performed, the shaft is in surface contact with each of the pair of the sleeve dynamic pressure corresponding portions at positions opposite to the axis of the shaft.

2. The disk drive device according to claim 1, wherein the form of the radial dynamic pressure groove is defined such that the point where the maximum radial dynamic pressure is generated by the radial dynamic pressure groove in the radial dynamic pressure generating portion, is located more toward an axial center of the radial space portion than an axial center of the radial dynamic pressure generating portion.

3. The disk drive device according to claim 1, wherein the radial dynamic pressure groove is formed such that a length between the turned-back portion of the herringbone-shaped radial dynamic pressure groove and an outer end of the radial dynamic pressure groove toward an outer end of the radial space portion is larger than a length between the turned-back portion of the herringbone-shaped radial dynamic pressure groove and an inner end of the radial dynamic pressure groove toward an axial center of the radial space portion.

4. The disk drive device according to claim 1, wherein the sleeve is made of a copper alloy or stainless steel.

5. The disk drive device according to claim 1, wherein the radial dynamic pressure groove is formed by at least cutting.

\* \* \* \* \*